US010677123B2

(12) United States Patent
Uchiyama et al.

(10) Patent No.: US 10,677,123 B2
(45) Date of Patent: Jun. 9, 2020

(54) EXHAUST PURIFICATION DEVICE

(71) Applicant: ISUZU MOTORS LIMITED, Tokyo (JP)

(72) Inventors: Tadashi Uchiyama, Kamakura (JP); Satoshi Hanawa, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 253 days.

(21) Appl. No.: 15/552,218

(22) PCT Filed: Feb. 17, 2016

(86) PCT No.: PCT/JP2016/054589
§ 371 (c)(1),
(2) Date: Aug. 18, 2017

(87) PCT Pub. No.: WO2016/133127
PCT Pub. Date: Aug. 25, 2016

(65) Prior Publication Data
US 2018/0038251 A1    Feb. 8, 2018

(30) Foreign Application Priority Data
Feb. 20, 2015    (JP) .................................. 2015-031526

(51) Int. Cl.
*F01N 9/00*       (2006.01)
*F01N 3/027*      (2006.01)
(Continued)

(52) U.S. Cl.
CPC ........... *F01N 3/0275* (2013.01); *F01N 3/023* (2013.01); *F01N 9/002* (2013.01); *G01N 27/22* (2013.01);
(Continued)

(58) Field of Classification Search
CPC ........ F01N 3/023; F01N 3/0275; F01N 9/002; F01N 13/009; F01N 2240/16;
(Continued)

(56) References Cited

U.S. PATENT DOCUMENTS 5,560,757 A * 10/1996 Suzuki ............... B01D 39/2082
                                                     55/516
2005/0180888 A1* 8/2005 Pidria ................ G01N 15/0656
                                                     422/83
(Continued)

FOREIGN PATENT DOCUMENTS

DE    102005016132 A1    10/2006
EP       2199553 A1       6/2010
(Continued)

OTHER PUBLICATIONS

International Search Report and Written Opinion for PCT App No. PCT/JP2016/054589 dated May 17, 2016, 10 pgs.
(Continued)

*Primary Examiner* — Matthew T Largi
(74) *Attorney, Agent, or Firm* — Procopio, Cory, Hargreaves & Savitch LLP (57) ABSTRACT

There is provided a first PM sensor provided upstream of a filter and including a first sensor filter having a plurality of first cells collecting PM in the exhaust gas to be introduced into the filter, and a first pair of electrodes arranged to face each other with the first cell interposed therebetween, a second PM sensor provided downstream of the filter and including a second sensor filter having a plurality of second cells collecting PM in the exhaust gas discharged from the filter, and a second pair of electrodes arranged to face each other with the second cell interposed therebetween, and a filter state determination unit for acquiring an efficiency of collecting the PM in the filter, based on a first electrostatic capacitance between the first pair of electrodes and a second
(Continued)

electrostatic capacitance between the second pair of electrodes.

6 Claims, 6 Drawing Sheets

(51) Int. Cl.
- *F01N 3/023* (2006.01)
- *G01N 27/22* (2006.01)
- *F01N 3/025* (2006.01)
- *F01N 3/10* (2006.01)
- *F01N 3/20* (2006.01)
- *F01N 13/00* (2010.01)

(52) U.S. Cl.
CPC ............ *F01N 3/0253* (2013.01); *F01N 3/103* (2013.01); *F01N 3/2033* (2013.01); *F01N 13/009* (2014.06); *F01N 2240/16* (2013.01); *F01N 2260/04* (2013.01); *F01N 2560/05* (2013.01); *F01N 2560/14* (2013.01); *F01N 2560/20* (2013.01); *F01N 2610/03* (2013.01); *F01N 2900/0416* (2013.01); *F01N 2900/0422* (2013.01); *F01N 2900/1402* (2013.01); *F01N 2900/1606* (2013.01); *Y02T 10/47* (2013.01)

(58) Field of Classification Search
CPC ............ F01N 2260/04; F01N 2560/05; F01N 2560/14; F01N 2560/20; F01N 2610/03; F01N 2900/0416; F01N 2900/0422; F01N 2900/1402; F01N 2900/1606; F01N 3/0253; F01N 3/103; F01N 3/2033; G01N 27/22

See application file for complete search history.

(56) References Cited

U.S. PATENT DOCUMENTS

| | | | | |
|---|---|---|---|---|
| 2008/0048681 | A1* | 2/2008 | Birkhofer | F01N 9/002 324/693 |
| 2011/0047978 | A1* | 3/2011 | Zawacki | F02D 41/1494 60/277 |
| 2011/0314796 | A1* | 12/2011 | Nakamura | F01N 9/002 60/276 |
| 2011/0320171 | A1* | 12/2011 | Okayama | B01D 46/0086 702/183 |
| 2012/0102924 | A1* | 5/2012 | Ante | F01N 9/002 60/274 |
| 2012/0144813 | A1* | 6/2012 | Yahata | F01N 11/007 60/311 |
| 2013/0014641 | A1* | 1/2013 | Takaoka | F01N 3/0253 95/26 |
| 2014/0230532 | A1* | 8/2014 | Huq | F01N 11/00 73/114.69 |

FOREIGN PATENT DOCUMENTS

| | | | |
|---|---|---|---|
| EP | 2551479 | A1 | 1/2013 |
| JP | 2002-285822 | A | 10/2002 |
| JP | 2008-063985 | A | 3/2008 |
| JP | 2012-117383 | A | 6/2012 |
| JP | 2012117383 | A * | 6/2012 |
| JP | 2012-149525 | A | 8/2012 |
| JP | 2013-160617 | A | 8/2013 |

OTHER PUBLICATIONS

Extended European Search Report for EP App No. 16752513.8 dated Jun. 28, 2018, 9 pgs.

* cited by examiner

FIG. 6B

# EXHAUST PURIFICATION DEVICE

CROSS-REFERENCE TO RELATED APPLICATIONS

This application is a U.S. National Stage entry of PCT Application No. PCT/JP2016/054589, filed on Feb. 17, 2016, which claims priority to Japanese Patent Application No. 2015-031526, filed Feb. 20, 2015, the contents of which are incorporated herein by reference.

TECHNICAL FIELD

The present invention relates to an exhaust purification device for purifying exhaust gas by collecting particular matter (hereinafter, referred to as PM) contained in the exhaust gas.

BACKGROUND ART

Exhaust purification devices for purifying exhaust gas discharged from an internal combustion engine by collecting PM contained in the exhaust gas by means of a filter are known. As the exhaust purification devices, a device is also known in which PM sensors are respectively arranged upstream and downstream of a filter in an exhaust direction, so that it is possible to determine whether or not the filter has a failure. For example, in an exhaust purification device described in Patent Reference 1, resistance-type PM sensors, which can be regenerated by a heater, are respectively arranged upstream and downstream of a filter in an exhaust direction. An inflow PM amount to be introduced into the filter and an outflow PM amount discharged from the filter are acquired based on detection signals from the respective PM sensors, and also a collecting efficiency is obtained therefrom. Then, whether or not the filter has a failure is determined by comparing the collecting efficiency with a predetermined determination threshold.

PRIOR ART REFERENCE

Patent Reference

Patent Reference 1: JP-A-2012-149525

DISCLOSURE OF THE INVENTION

Problems to be Solved

However, with regard to the filter, it is preferable that it is possible to recognize a tendency of the collecting efficiency to degrade before the filter is determined to have a failure. The reason is that an action such as replacement or repair can be taken before failure. Accordingly, it is preferable to acquire the PM collecting efficiency in real time.

An object of the disclosure is to provide an exhaust purification device in which it is possible to acquire a PM collecting efficiency in real time.

Means for Solving the Problems

An exhaust purification device according to the disclosure includes a filter provided in an exhaust system of an internal combustion engine and collecting particulate matter in exhaust gas; a first sensor provided upstream of the filter in an exhaust direction of the exhaust gas and including: a first sensor filter having a plurality of first cells divided by porous partition walls and collecting the particulate matter in the exhaust gas to be introduced into the filter; and at least one pair of first electrodes arranged to face each other with the first cell interposed therebetween so as to form a capacitor; a second sensor provided downstream of the filter in the exhaust direction of the exhaust gas and including: a second sensor filter having a plurality of second cells divided by porous partition walls and collecting the particulate matter in the exhaust gas discharged from the filter; and at least one pair of second electrodes arranged to face each other with the second cell interposed therebetween so as to form a capacitor; and acquisition means for acquiring an efficiency of collecting the particulate matter in the filter, based on a first electrostatic capacitance between the pair of first electrodes and a second electrostatic capacitance between the pair of second electrodes.

Further, an exhaust purification system according to the disclosure includes a filter provided in exhaust gas passage of an internal combustion engine and collecting particulate matter in exhaust gas; a first sensor provided upstream of the filter in an exhaust direction of the exhaust gas and including: a first sensor filter having a plurality of first cells divided by porous partition walls and collecting the particulate matter in the exhaust gas to be introduced into the filter; and at least one pair of first electrodes arranged to face each other with the first cell interposed therebetween so as to form a capacitor; a second sensor provided downstream of the filter in the exhaust direction of the exhaust gas and including: a second sensor filter having a plurality of second cells divided by porous partition walls and collecting the particulate matter in the exhaust gas discharged from the filter; and at least one pair of second electrodes arranged to face each other with the second cell interposed therebetween so as to form a capacitor; and a control unit, wherein the control unit is operated to execute t: an acquiring process of acquiring an efficiency of collecting the particulate matter in the filter, based on a first electrostatic capacitance between the pair of first electrodes and a second electrostatic capacitance between the pair of second electrodes.

Advantageous Effects of Invention

According to the exhaust purification device of the disclosure, it is possible to acquire a PM collecting efficiency of the filter in real time.

MODE FOR CARRYING OUT THE INVENTION

Hereinafter, sensors according to respective embodiments of the disclosure will be described with reference to the accompanying drawings. The same components will be designated by the same reference numerals, and the names and functions thereof are the same. Therefore, the detailed descriptions thereof will not be repetitively made.

First Embodiment

Figure 1:
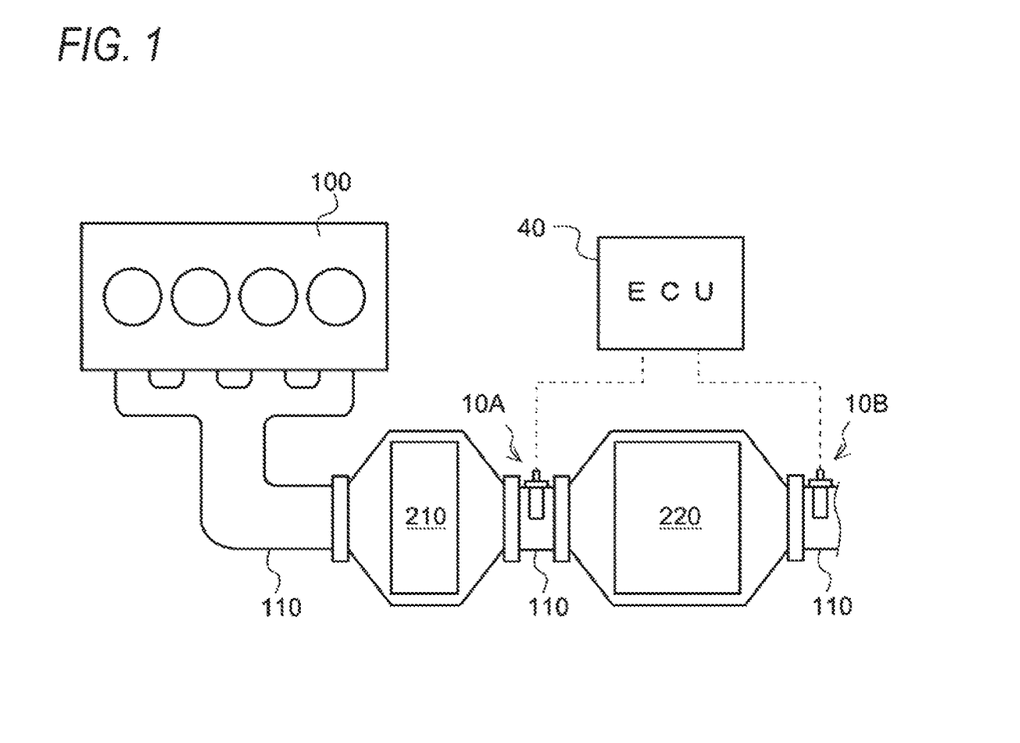
FIG. 1 is a schematic configuration view showing an example of an exhaust system to which a PM sensor of a first embodiment is applied.

FIG. 1 is a schematic configuration view showing an example of an exhaust system of a diesel engine (hereinafter, simply referred to as engine) 100, to which a first PM sensor 10A and a second PM sensor 10B according to the first embodiment are applied. In an exhaust pipe 110 of the engine 100, an oxidation catalyst 210, a diesel particulate filter (DPF, hereinafter, simply also referred to as filter) 220 and the like are provided in this order from an upstream side in an exhaust direction.

The oxidation catalyst 210 is configured to oxidize unburned fuel (hydrocarbon (HC)) and to increase a temperature of the exhaust gas when the unburned fuel is supplied thereto. The filter 220 is formed so that a plurality of cells divided by porous partition walls are arranged along exhaust gas flow direction and are alternately plugged at upstream and downstream sides of the cells. The filter 220 is configured so that PM in the exhaust gas is collected by micro-holes or surfaces of the partition walls and if an estimated amount of PM accumulated thereon reaches a predetermined amount, a so-called filter forced regeneration of combusting and removing the PM accumulated thereon is executed. The filter forced regeneration is performed, for example, by supplying unburned fuel to the oxidation catalyst 210 upstream of the filter 220 and thus increasing a temperature of the exhaust gas to be introduced into the filter 220 to a PM combustion temperature.

The first PM sensor 10A is provided in the exhaust pipe 110 upstream of the filter 220 in the exhaust direction, more specifically in the exhaust pipe 110 between the oxidation catalyst 210 and the filter 220 and is configured to detect an amount of PM contained in the exhaust gas to be introduced into the filter 220. The second PM sensor 10B is provided in the exhaust pipe 110 downstream of the filter 220 in the exhaust direction, more specifically in the exhaust pipe 110 immediately after the filter 220 and is configured to detect an amount of PM contained in the exhaust gas discharged from the filter 220.

Figure 2:
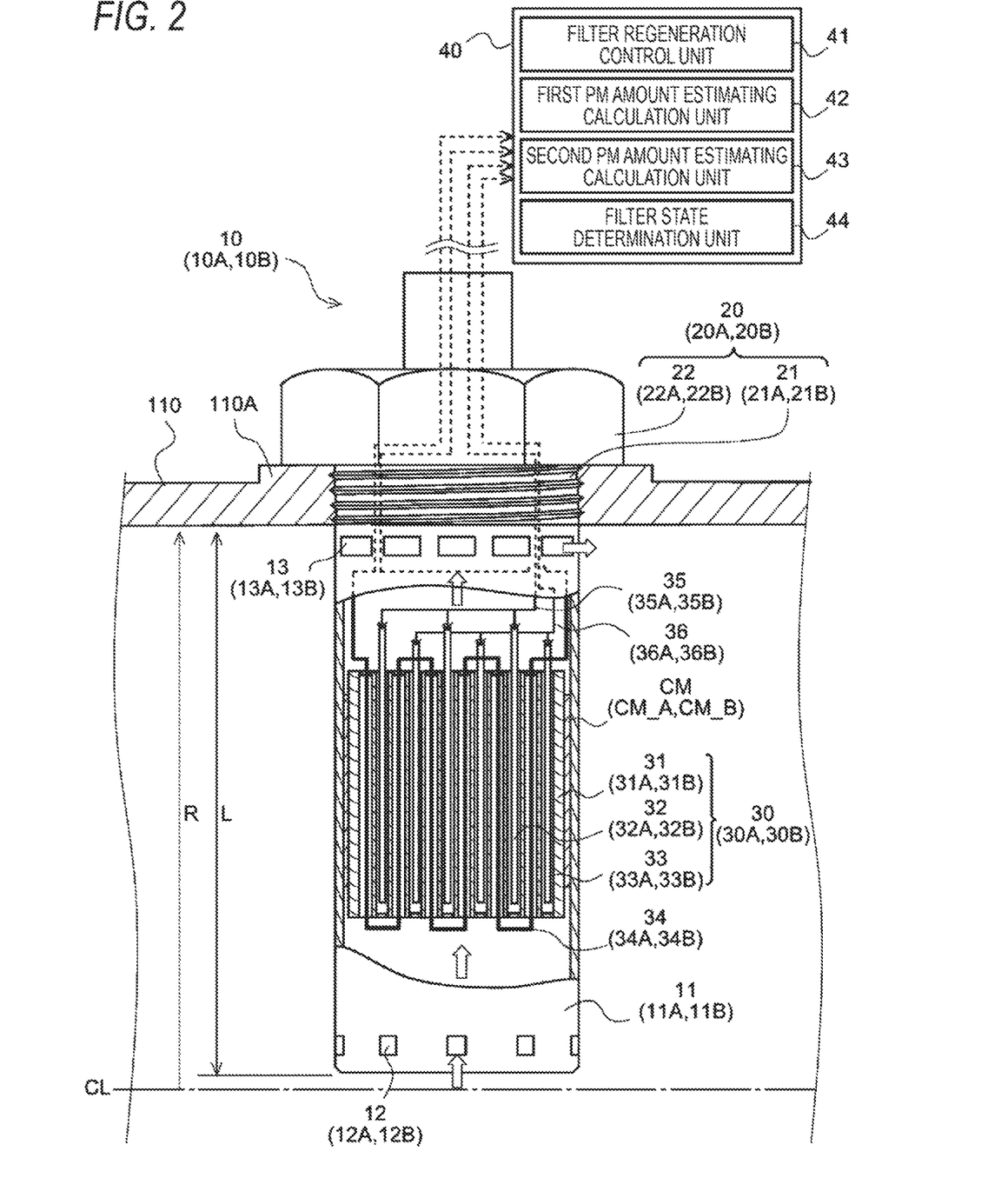
FIG. 2 is a schematic partially sectional view showing the PM sensor of the first embodiment.

Next, the detailed configurations of the first PM sensor 10A and the second PM sensor 10B according to the first embodiment will be described with reference to FIG. 2. As shown in FIG. 2, the first PM sensor 10A and the second PM sensor 10B have the same structure. Accordingly, in the following description, the PM sensors 10A, 10B will be collectively referred as PM sensor 10. In the description, for each of components equipped in the first PM sensor 10A, the word 'first' is attached to the beginning of the term thereof and a symbol 'A' is attached to the end. Also, for each of components equipped in the second PM sensor 10B, the word 'second' is attached to the beginning of the term thereof and a symbol 'B' is attached to the end.

The PM sensor 10 (first PM sensor 10A, second PM sensor 10B) includes a case member 11 (first case member 11A, second case member 11B) inserted in the exhaust pipe 110, a pedestal portion 20 (first pedestal portion 20A, second pedestal portion 20B) configured to attach the case member 11 to the exhaust pipe 110, a sensor unit 30 (first sensor unit 30A, second sensor unit 30B) accommodated in the case member 11 and a control unit 40.

The case member 11 has a shape of a bottomed cylinder, of which a bottom side (a lower end side in the shown example) is closed. A length L of the case member 11 in a cylinder axis direction is substantially the same as a radius R of the exhaust pipe 110 so that a cylindrical wall portion at the bottom side protrudes to a location near to a center axis CL of the exhaust pipe 110. Here, in the following descriptions, the bottom side of the case member 11 is referred to as a distal end side, and an opposite side to the bottom side is referred to as a base end side of the case member 11.

A cylindrical wall portion of the case member 11 at the distal end side is provided with a plurality of inflow ports 12 (first inflow port 12A, second inflow port 12B) arranged to be spaced from each other in a circumferential direction. Also, a cylindrical wall portion of the case member 11 at the base end side is provided with a plurality of outflow ports 13 (first outflow port 13A, second outflow port 13B) arranged to be spaced from each other in the circumferential direction. A total opening area $S_{12}$ of the inflow ports 12 is smaller than a total opening area $S_{13}$ of the outflow ports 13 ($S_{12}<S_{13}$). That is, an exhaust flow velocity $V_{12}$ in the vicinity of the inflow ports 12 becomes slower than an exhaust flow velocity $V_{13}$ in the vicinity of the outflow ports 13 ($V_{12}<V_{13}$), so that a pressure $P_{12}$ at the inflow ports 12 becomes higher than a pressure $P_{13}$ at the outflow ports 13 ($P_{12}>P_{13}$). Thus, the exhaust gas smoothly flows into the case member 11 through the inflow ports 12, and the exhaust gas in the case member 11 smoothly flows out through the outflow ports 13 into the exhaust pipe 110.

The pedestal portion 20 has a male screw portion 21 (first male screw portion 21A, second male screw portion 21B) and a nut portion 22 (first nut portion 22A, second nut portion 22B). The male screw portion 21 is provided on a base end portion of the case member 11 and is configured to close an opening of the case member 11 at the base end side. The male screw portion 21 is screwed with a female screw portion of a boss portion 110A formed on the exhaust pipe 110. The nut portion 22 is, for example, a hexagonal nut and is fixed to an upper end portion of the male screw portion 21. The male screw portion 21 and the nut portion 22 have through-holes (not shown) formed therein, through which conductive wires 35, 36 (first conductive wires 35A, 36A, second conductive wires 35B, 36B) and the like as described below are to be inserted.

The sensor unit 30 (first sensor unit 30A, second sensor unit 30B) has a sensor filter 31 (first sensor filter 31A, second sensor filter 31B), a plurality of pairs of electrodes 32, 33 (first pairs of electrodes 32A, 33A, second pairs of electrodes 32B, 33B) and an electrical heater 34 (first electrical heater 34A, second electrical heater 34B).

The sensor filter 31 is formed so that a plurality of cells, which form lattice-shaped exhaust flow paths divided by partition walls of, for example, porous ceramics, are alternately plugged at upstream and downstream sides thereof. The sensor filter 31 is held on an inner peripheral surface of the case member 11 via a cushion member CM in a state where a flow path direction of the cells is arranged to be substantially parallel to an axial direction (an upward and downward direction in the figure) of the case member 11.

Figure 3:
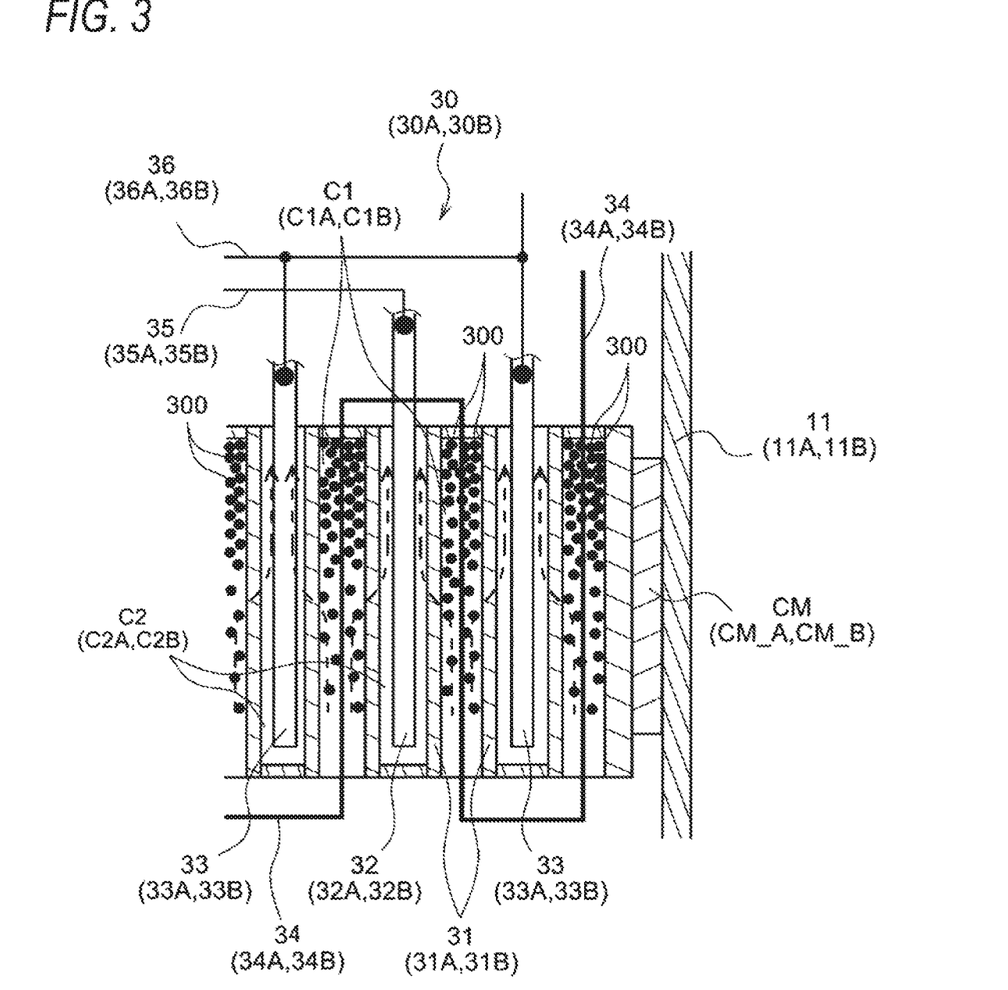
FIG. 3 is a partially enlarged sectional view explaining collecting of PM.

As enlargedly shown in FIG. 3, PM 300 in the exhaust gas introduced in the case member 11 through the inflow ports 12 is collected by surfaces or micro-holes of partition walls as the exhaust gas flows from cells C1 (C1A, C1B) plugged at the downstream side thereof into cells C2 (C2A, C2B) plugged at the upstream side thereof as shown by broken line arrows. Meanwhile, in the following description, the cell plugged at the downstream side thereof is referred to as a measurement cell C1 (first measurement cell C1A, second measurement cell C1B) and the cell plugged at the upstream side thereof is referred to as an electrode cell C2 (first electrode cell C2A, second electrode cell C2B).

As shown in FIG. 2, the electrodes 32, 33 are, for example, conductive metal wires and are alternately inserted into the electrode cells C2 (first electrode cell C2A, second electrode cell C2B), which face each other with the measurement cell C1 interposed therebetween, from the downstream sides (unplugged side) thereof, thereby forming a capacitor. The electrodes 32, 33 are respectively connected to an electrostatic capacitance detection circuit (not shown) embedded in the control unit 40, via the conductive wires 35, 36 (first conductive wires 35A, 36A, second conductive wires 35B, 36B).

The electrical heater 34 is, for example, an electric heating wire and is configured to generate heat by being energized and thus to directly heat the sensor filter 31, thereby executing a so-called filter regeneration of combusting and removing the PM accumulated in the measurement cells C1. Accordingly, the electrical heater 34 is formed to be bent into a continuous S-shape, and linear portions thereof parallel to each other are inserted in the respective measurement cells C1 along the flow paths thereof.

The control unit 40 has a filter regeneration control unit 41, a first PM amount estimating calculation unit 42, a second PM amount estimating calculation unit 43 and a filter state determination unit 44 as individual functional elements. The functional elements are described as being contained in the control unit 40, which is a unitary hardware, but may be provided in separate hardware.

The filter regeneration control unit 41 is an example of the filter regeneration means of the present invention and is configured to determine whether or not a filter regeneration condition is satisfied, based on an electrostatic capacitance Cp between the electrodes 32, 33, which is detected by an electrostatic capacitance detection circuit (not shown), and then to execute filter regeneration control of turning on (energizing) the electrical heater 34 in a case where the filter regeneration condition is satisfied. The electrostatic capacitance Cp between the electrodes 32, 33 is expressed by the following equation 1, where c is a dielectric constant of a medium between the electrodes 32, 33, S is a surface area of the electrodes 32, 33 and d is a distance between the electrodes 32, 33.

[Equation 1]

$$Cp = \sum \left( \varepsilon \times \frac{S}{d} \right) \quad (1)$$

In the equation 1, the surface area S of the electrodes 32, 33 is constant, and when the dielectric constant $\varepsilon$ and the distance d are changed by the PM collected in the measurement cells C1, the electrostatic capacitance Cp is correspondingly changed. That is, the electrostatic capacitance Cp between the electrodes 32, 33 and an amount of the PM accumulated in the sensor filter 31 have a proportional relation.

If either one of a first electrostatic capacitance $Cp_A$ between the first pair of electrodes 32A, 33A equipped in the first PM sensor 10A, which is calculated based on a dielectric constant $\varepsilon_A$ of a medium between the first pair of electrodes 32A, 33A, a surface area $S_A$ thereof and a distance $d_A$ therebetween, and a second electrostatic capacitance $Cp_B$ between the second pair of electrodes 32B, 33B equipped in the second PM sensor 10B, which is calculated based on a dielectric constant $\varepsilon_B$ of a medium between the second pair of electrodes 32B, 33B, a surface area $S_B$ thereof and a distance $d_B$ therebetween, reaches a predetermined electrostatic capacitance upper threshold $C_{P\_max}$, which indicates an upper limit amount of the accumulated PM, the filter regeneration control unit 41 determines that the filter regeneration condition is satisfied and thus starts filter regeneration of turning on the respective electrical heaters 34A, 34B. The filter regeneration continues until the respective electrostatic capacitances $Cp_A$, $Cp_B$ are lowered to a predetermined electrostatic capacitance lower threshold $C_{P\_min}$, which indicates that the PM is completely removed.

Meanwhile, as shown in FIG. 1, in the present embodiment, the first PM sensor 10A is arranged upstream of the filter 220 in the exhaust direction and the second PM sensor 10B is arranged downstream of the filter 220 in the exhaust direction. Accordingly, when the filter 220 is collecting PM, the PM is accumulated earlier in the first PM sensor 10A than in the second PM sensor 10B, and thus the first electrostatic capacitance $Cp_A$ reaches the upper threshold $C_{P\_max}$ first.

The first PM amount estimating calculation unit 42 estimates a total PM amount $m_{PM\_A}$ in the exhaust gas, which is to be introduced into the filter 220, based on an electrostatic capacitance change amount $\Delta Cp_A$ of the first PM sensor 10A during a regeneration interval period (from the end of the filter regeneration to the start of the next filter regeneration). The PM amount $m_{PM\_A}$ collected in the first sensor filter 31A during the regeneration interval period is obtained by the following equation 2, in which the electrostatic capacitance change amount $\Delta Cp_A$ of the first PM sensor 10A is multiplied by a linear coefficient β.

[Equation 2]

$$m_{PM\_A} = \beta \cdot \Delta Cp_A \quad (2)$$

The second PM amount estimating calculation unit 43 estimates a total PM amount $m_{PM\_B}$ in the exhaust gas, which is discharged from the filter 220, based on an electrostatic capacitance change amount $\Delta Cp_B$ of the second PM sensor 10B during the regeneration interval period. The PM amount $m_{PM\_B}$ collected in the second sensor filter 31B during the regeneration interval period is obtained by the following equation 3, in which the electrostatic capacitance change amount $\Delta Cp_B$ of the second PM sensor 10B is multiplied by a linear coefficient β.

[Equation 3]

$$m_{PM\_B} = \beta \cdot \Delta Cp_B \quad (3)$$

The filter state determination unit 44 is an example of the acquisition means of the present invention and is configured to acquire in real time a PM collecting efficiency of the filter 220, based on the electrostatic capacitance change amount $\Delta Cp_A$ of the first PM sensor 10A during the regeneration interval period and the electrostatic capacitance change amount $\Delta Cp_B$ of the second PM sensor 10B during the regeneration interval period, thereby determining a state of the filter 220.

Figure 4A:
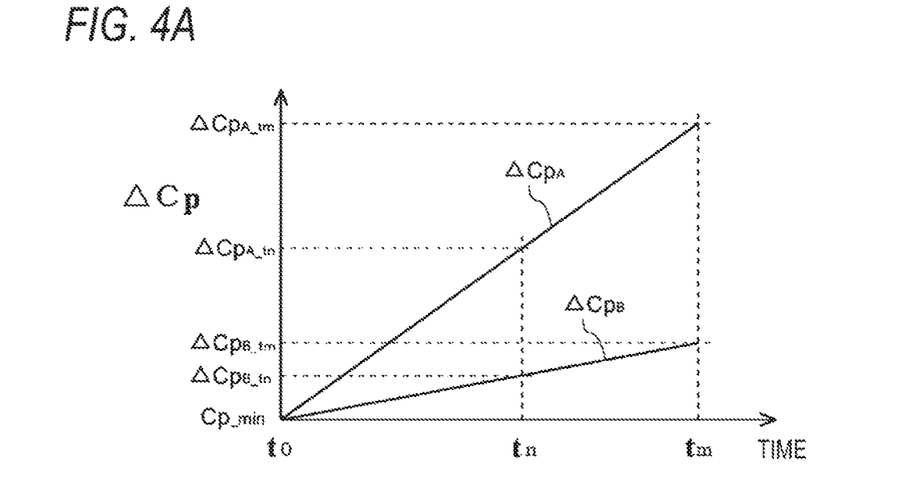
FIG. 4A is a chart explaining a change over time in electrostatic capacitance change amount of a first PM sensor and a second PM sensor.

In the example shown in FIG. 4A, the electrostatic capacitance change amount $\Delta Cp_A$ of the first PM sensor 10A at a time $t_0$ is the electrostatic capacitance lower threshold $C_{P\_min}$. Thereafter, the electrostatic capacitance change amount $\Delta Cp_A$ is increased over time and thus becomes $\Delta Cp_{A\_tn}$ at a time $t_n$ and $\Delta Cp_{A\_tm}$ at a time $t_m$. Similarly, the electrostatic capacitance change amount $\Delta Cp_B$ of the second PM sensor 10B at a time $t_0$ is the electrostatic capacitance lower threshold $C_{P\_min}$. Thereafter, the electrostatic capacitance change amount $\Delta Cp_B$ is increased over time and thus becomes $\Delta Cp_{B\_tn}$ at a time $t_n$ and $\Delta Cp_{B\_tm}$ at a time $t_m$.

In comparison between the electrostatic capacitance change amount $\Delta Cp_A$ and the electrostatic capacitance change amount $\Delta Cp_B$, the electrostatic capacitance change amount $\Delta Cp_A$ has a gradient (increment per unit time) greater than that of the electrostatic capacitance change amount $\Delta Cp_B$. The reason is that an object to be detected by the second PM sensor 10B is the exhaust gas after being purified in the filter 220, whereas an object to be detected by the first PM sensor 10A is the exhaust gas before being purified in the filter 220.

The filter state determination unit 44 monitors in real time the electrostatic capacitance change amount $\Delta Cp_A$ of the first PM sensor 10A and the electrostatic capacitance change amount $\Delta Cp_B$ of the second PM sensor 10B, and determines a state of the filter 220 based on the electrostatic capacitance change amount $\Delta Cp_A$ and the electrostatic capacitance change amount $\Delta C_{PB}$.

For example, the filter state determination unit 44 acquires as a PM collecting efficiency of the filter 220 a calculated value $\Delta Cp_B/\Delta Cp_A$ obtained by dividing the electrostatic capacitance change amount $\Delta Cp_B$ by the electrostatic capacitance change amount $\Delta Cp_A$. The calculated value $\Delta Cp_B/\Delta Cp_A$ is a ratio of an amount of PM (integrated amount $\Delta Cp_B$), which is discharged from the filter 220 without being collected therein, to an amount of PM (integrated amount $\Delta Cp_A$) to be introduced into the filter 220 during a period from the time $t_0$ to a determination time (the latest time) and thus can refer to the collecting efficiency. The filter state determination unit 44 is configured to determine that a PM collecting ability of the filter 220 has been degraded due to abnormality when the calculated value $\Delta Cp_B/\Delta Cp_A$ is equal to or greater than a predetermined determination threshold. The determination threshold is previously obtained by an experiment or the like and then stored in a memory (not shown) of ECU 40.

Further, the filter state determination unit 44 is configured to calculate in real time a difference between the calculated value $\Delta Cp_B/\Delta Cp_A$ and the determination threshold and then to determine whether or not an abnormal tendency exists, based on a time-series change of the difference. For example, if the calculated value $\Delta Cp_B/\Delta Cp_A$ and the determination threshold are decreased over time and the difference becomes equal to or lower than a determination threshold for the difference, the filter state determination unit 44 determines that there is a possibility that an abnormality will occur in the filter 220.

As such, according to the present embodiment, the filter state determination unit 44 can acquire a PM collecting efficiency of the filter 220 based on the first electrostatic capacitance $Cp_A$ of the first pair of electrodes 32A, 33A and the second electrostatic capacitance $Cp_B$ of the second pair of electrodes 32B, 33B, thereby acquiring in real time the PM collecting efficiency. Therefore, it is possible to determine in real time an abnormal degradation in PM collecting ability of the filter 220 or a tendency of the PM collecting ability to degrade (abnormal tendency).

In addition, according to the present embodiment, the first PM sensor 10A is provided upstream of the filter 220 in the exhaust direction. Therefore, it is possible to recognize an amount of PM to be introduced into the filter 220 with high accuracy. That is, although the amount of PM to be introduced into the filter 220 can be estimated from an operating state of the engine 100, properties of fuel and the like, if the amount is corrected by the quality of fuel, it is difficult to guarantee accuracy and the like. In this regard, in the present embodiment, determination with high accuracy can be made, since the first PM sensor 10A is provided.

Meanwhile, in the embodiment as described above, the total PM amount $m_{PM\_A}$ in the exhaust gas to be introduced into the filter 220, the total PM amount $m_{PM\_B}$ in the exhaust gas discharged from the filter 220 and the PM collecting efficiency of the filter 220 are acquired based on the first electrostatic capacitance $Cp_A$ (electrostatic capacitance change amount $\Delta Cp_A$) and the second electrostatic capacitance $Cp_B$ (electrostatic capacitance change amount $\Delta Cp_B$)

Herein, the ECU 40 acquires output signals from the first PM sensor 10A and the second PM sensor 10B at short repetition periods, at which the signals can be regarded as real time signals, thereby acquiring the first electrostatic capacitance $Cp_A$, the second electrostatic capacitance $Cp_B$ and the like. Accordingly, a change rate (change amount per unit time $\Delta dCp/\Delta t$) of the respective electrostatic capacitances $Cp_A$, $Cp_B$ may be calculated from a plurality of first electrostatic capacitances $Cp_A$ and second electrostatic capacitances $Cp_B$ including the latest first electrostatic capacitance $Cp_A$ and the latest second electrostatic capacitance $Cp_B$, respectively, and then the PM collecting efficiency of the filter 200 may be acquired based on the change rate of the respective electrostatic capacitances $Cp_A$, $Cp_B$.

Figure 4B:
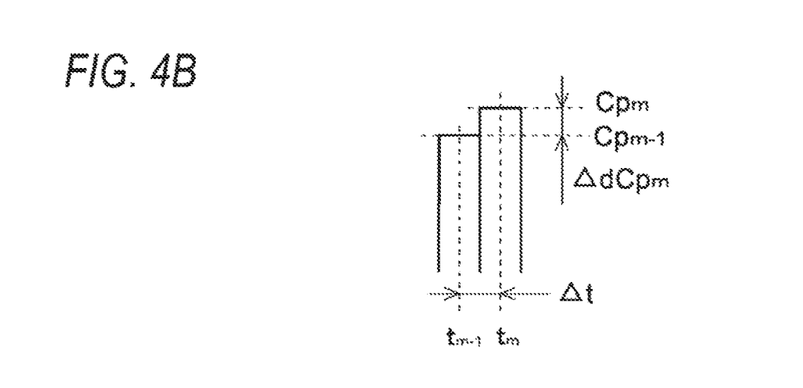
FIG. 4B schematically illustrates a difference between electrostatic capacitances captured periodically.

In the example of FIG. 4B, the change rate $\Delta dCp_m/\Delta t$ is calculated from the latest respective electrostatic capacitances $CP_m$ ($Cp_{A\_m}$, $Cp_{B\_m}$) and respective electrostatic capacitances $CP_{m-1}$ ($Cp_{A\_m-1}$, $Cp_{B\_m-1}$) one period before. Similarly, in the example of FIG. 4C, the change rate $(\Delta dCp_m+\Delta dCp_{m-1}+\Delta dCp_{m-2})/3\Delta t$ is calculated from the latest respective electrostatic capacitances $CP_m$, respective electrostatic capacitances $CP_{m-1}$ one period before, respective electrostatic capacitances $CP_{m-2}$ two periods before and respective electrostatic capacitances $CP_{m-1}$ three periods before. That is, a filtering process is performed.

In this way, by calculating the change rate $\Delta dCp_{A\_m}/\Delta t$ in the first PM sensor 10A and the change rate $\Delta dCp_{B\_m}/\Delta t$ in the second PM sensor 10B, the latest instantaneous values on the total PM amount $m_{PM\_A}$ in the exhaust gas to introduced into the filter 220, the total PM amount $m_{PM\_B}$ in the exhaust gas discharged from the filter 220 and the PM collecting efficiency of the filter 220 can be acquired. For the total PM amount $m_{PM\_A}$, the total PM amount $m_{PM\_B}$ and the PM collecting efficiency, an PM amount $m_{PM}$ corresponding to the change rate $\Delta dCp_{A\_m}/\Delta t$ or the change rate $\Delta dCp_{B\_m}/\Delta t$ can be acquired using a map representing a relationship between the change rate $\Delta dCp_{\_m}/\Delta t$ and the PM amount $m_{PM}$, which is previously obtained by, for example, an experiment or the like.

Figure 4C:
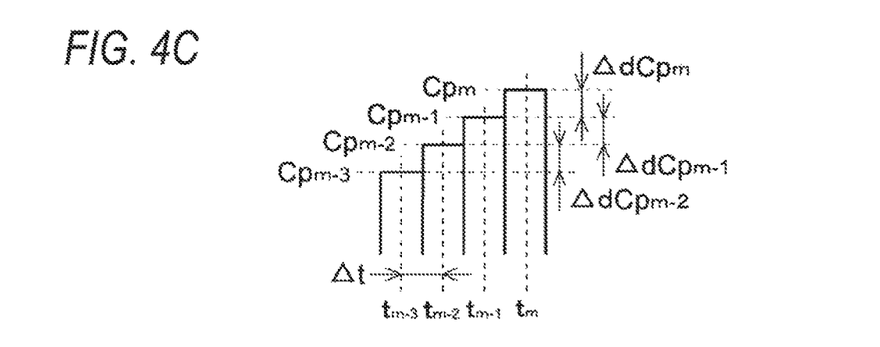
FIG. 4C schematically illustrates a difference between electrostatic capacitances captured periodically.

Further, by acquiring an average value of change rates of a plurality of periods as in FIG. 4C, an influence of a noise suddenly generated can be reduced.

It is possible to perform control for reducing a discharged amount of PM as desired, based on the instantaneous values. For example, control for decreasing a circulation amount of EGR, increasing an excess air ratio, reducing an injection amount of fuel, or adjusting an injection timing of fuel can be performed in real time with high accuracy.

Second Embodiment

Figure 5:
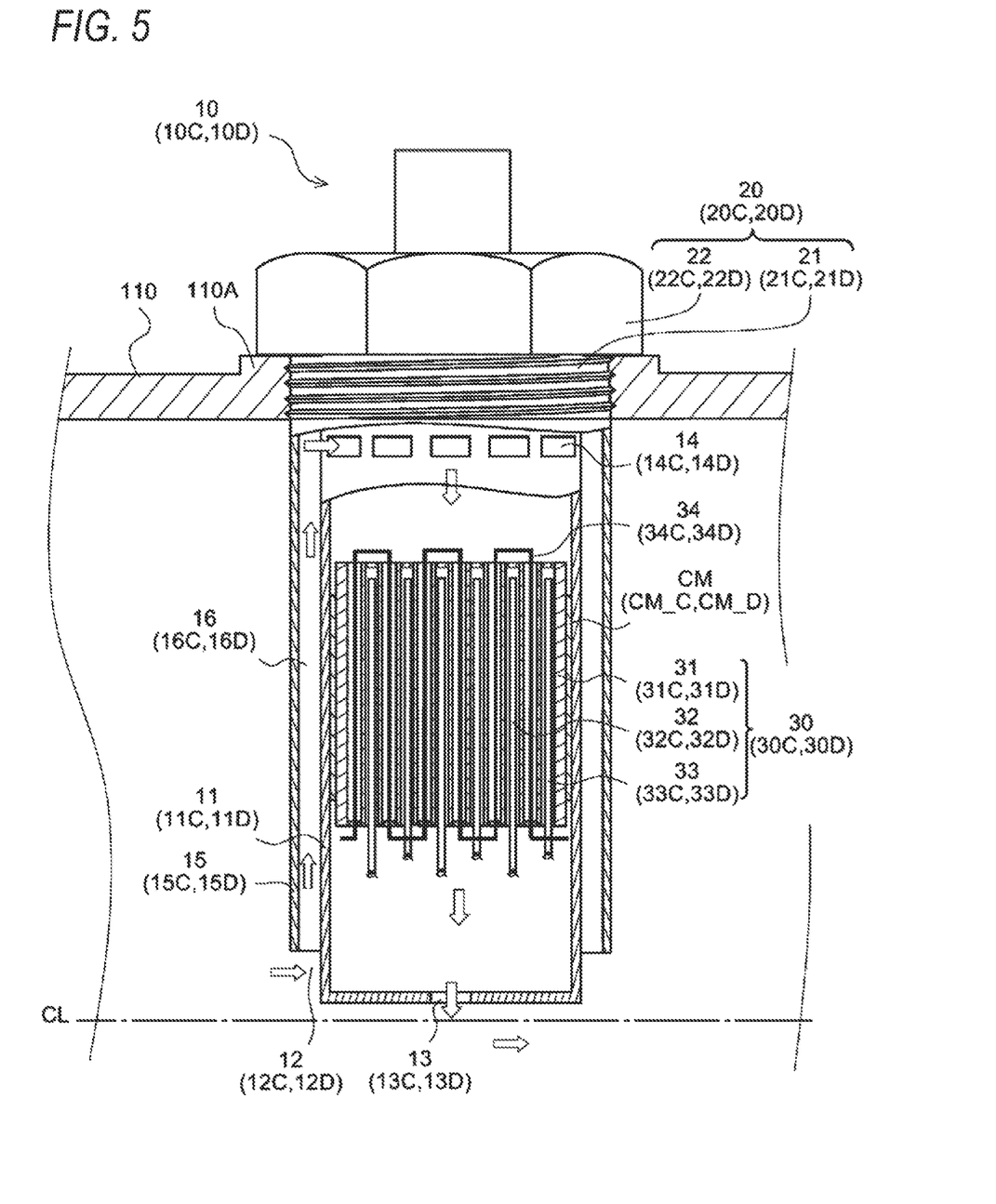
FIG. 5 is a schematic partially sectional view showing a PM sensor of a second embodiment.

Next, a PM sensor 10 (first PM sensor 10C, second PM sensor 10D) according to the second embodiment will be described in detail with reference to FIG. 5. The PM sensor 10 (10C, 10D) of the second embodiment is configured so that the case member in the PM sensor 10 (10A, 10B) of the first embodiment has a double pipe structure. The other components have the same structures, and accordingly the detailed descriptions thereof will be omitted. Also, some components, such as the control unit 40 and the like, are not shown.

The case member of the second embodiment has a cylindrical bottomed inner case portion 11 (11C, 11D) and a cylindrical outer case portion 15 (15C, 15D) surrounding a cylindrical outer peripheral surface of the inner case portion 11.

The inner case portion 11 is formed to have an axial length greater than that of the outer case portion 15 so that a distal end side thereof protrudes relative to the outer case portion 15. Also, a bottom portion of the inner case portion 11 is provided with an outflow port 13 (13C, 13D) for allowing exhaust gas in the inner case portion 15 to flow into an exhaust pipe 110. Further, a cylindrical wall portion of the inner case portion 11 at a base end side thereof is provided with a plurality of passage ports 14 (14C, 14D) arranged to be spaced with each other in a circumferential direction. The passage ports 14 are configured to allow exhaust gas in a flow path 16 (16C, 16D) defined between an outer peripheral surface of the inner case portion 11 and an inner peripheral surface of the outer case portion 15 to flow into the inner case portion 11.

On a downstream end of the flow path 16, a circular ring-shaped inflow port 12 (12C, 12D) defined between the cylindrical wall portion of the inner case portion 11 at the distal end side thereof and the distal end portion of the outer case portion 15 is formed. An opening area $S_{12}$ of the inflow port 12 is formed to be smaller than an opening area $S_{13}$ of the outflow port 13 ($S_{12} < S_{13}$).

That is, the exhaust gas flowing through the exhaust pipe 110 collides with the cylindrical wall surface of the inner case portion 11 protruding distally relative to the outer case portion 15 and thus is smoothly introduced into the flow path 16 through the inflow port 12 arranged near to a center axis CL of the exhaust pipe 110. Then, the exhaust gas flowing through the flow path 16 is introduced into the inner case portion 11 through the passage ports 14, passes through the sensor filter 31 (31C, 31D), and then smoothly flows out through the outflow port 13 arranged near to the center axis CL of the exhaust pipe 110 into the exhaust pipe 110. As such, in the PM sensors 10C, 10D of the second embodiment, the inflow port 12 and the outflow port 13 are arranged near to the center axis CL where an exhaust flow velocity is highest in the exhaust pipe 110, so that it is possible to effectively increase a flow rate of the exhaust gas passing through the sensor filter 31.

Third Embodiment

Next, a PM sensor according to the third embodiment will be described in detail with reference to FIG. 6. The PM sensor of the third embodiment is configured so that the sensor unit 30 (30A, 30B) of the first embodiment is a stack type. The other components have the same structures, and accordingly the detailed descriptions and illustrations thereof will be omitted.

Figure 6A:
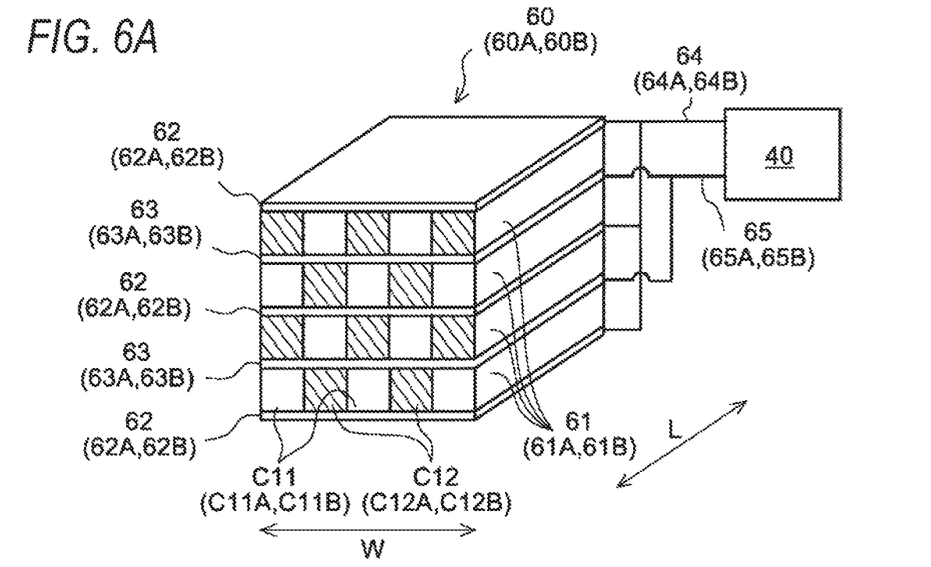
FIG. 6A is a schematic perspective view of each of sensor units according to a third embodiment.
Figure 6B:
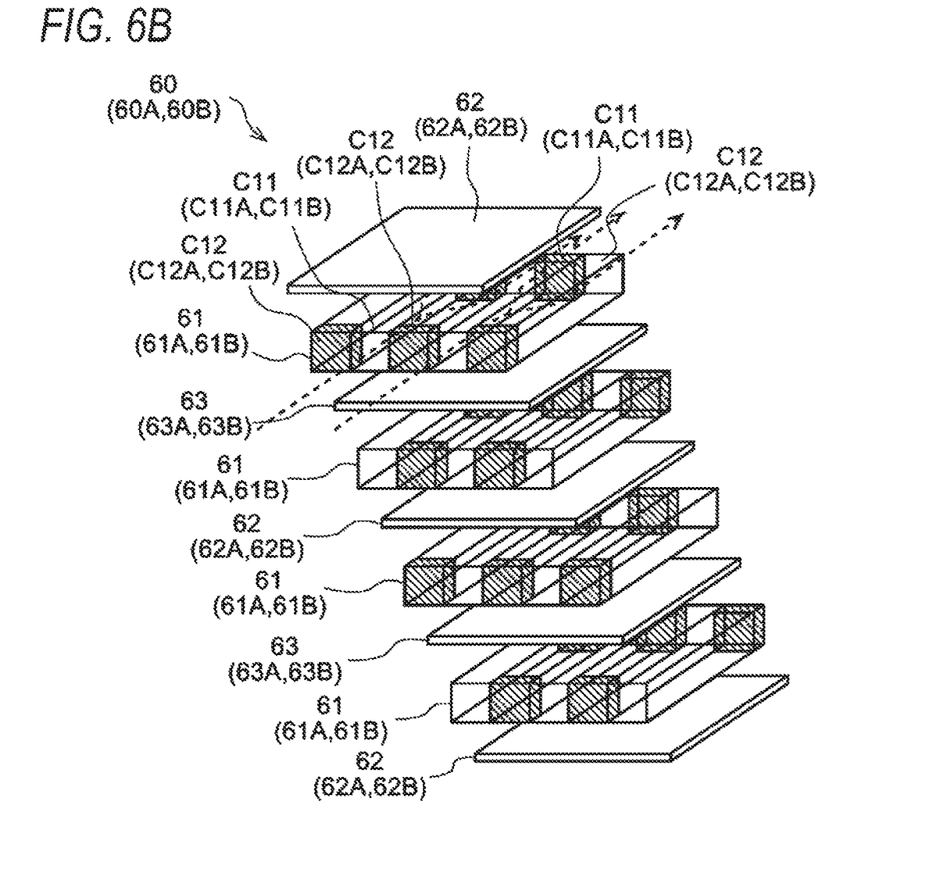
FIG. 6B is a schematic exploded perspective view of each of sensor units according to the third embodiment.

FIG. 6A is a perspective view of the sensor unit 60 (60A, 60B) of the third embodiment and FIG. 6B is an exploded perspective view of the sensor unit 60. The sensor unit 60 has a plurality of filter layers 61 (61A, 61B) and a plurality of electrode plates 62 (62A, 62B) and electrode plates 63 (63A, 63B).

The filter layer 61 is formed so that a plurality of cells, which are divided by partition walls of, for example, porous ceramics or the like and form exhaust flow paths, are alternately plugged at upstream and downstream sides thereof and the cells are arranged in parallel in one direction in a cuboid shape. PM contained in the exhaust gas is collected by surfaces or micro-holes of the partitions walls of the cells C11 as the exhaust gas flows from the cells C11 (C11A, C11B) plugged at the downstream side thereof into the cells C12 (C12A, C12B) plugged at the upstream side thereof as shown by broken line arrows in FIG. 6B. Meanwhile, in the following description, a flow path direction of the cells is referred to as a longitudinal direction (an arrow L in FIG. 6A) of the sensor unit 60, and a direction perpendicular to the flow path direction of the cells is referred to as a width direction (an arrow W in FIG. 6A) of the sensor unit 60.

The pair of electrode plates 62, 63 are conductive members having, for example, a flat plate shape, and external dimensions thereof in the longitudinal direction L and the width direction W are substantially the same as those of the filter layer 61. The pair of electrode plates 62, 63 are alternately stacked with the filter layer 61 interposed therebetween and are respectively connected to an electrostatic capacitance detection circuit (not shown) embedded in the control unit 40 via conductive wires 64 (64A, 64B) and conductive wires 65 (65A, 65B).

That is, the pair of electrode plates 62, 63 are arranged to face each other and the filter layer 61 are interposed between the electrode plates 62, 63, so that the entire cells C11 form a capacitor. As such, in the PM sensor of the third embodiment, the entire cells C11 are configured as the capacitor due to the electrode plates 62, 63 having a flat plate shape, so that it is possible to effectively secure an electrode surface area S and to increase an absolute value of a detectable electrostatic capacitance. Also, the distance d between the electrodes corresponds to a pitch of the cells and is uniform, so that it is possible to effectively suppress the non-uniformity of an initial electrostatic capacitance.

Meanwhile, when combusting and removing the PM accumulated in the cells C11, a voltage may be directly applied to the electrode plates 62, 63 or a heater board or the like (not shown) may be provided between the filter layer 61 and the electrode plates 62, 63.

[Others]

The present invention is not limited to the foregoing embodiments and changes thereof can be appropriately made without departing from the spirit and scope of the present invention.

This application is based on Japanese Patent Application No. 2015-031526 filed on Feb. 20, 2015, the entire contents of which are incorporated herein by reference.

INDUSTRIAL APPLICABILITY

The exhaust purification device of the present invention has the effect that it is possible to acquire a PM collecting efficiency in real time and thus is useful in that it is possible to recognize a tendency of the collecting efficiency to degrade before the filter is determined to have a failure.

REFERENCE SIGNS LIST 10 (10A to 10D) PM sensor
11 (11A, 11B) Case member
11 (11C, 11D) Inner case portion
12 (12A to 12D) Inflow port
13 (13A to 13D) Outflow port
20 (20A to 20D) Pedestal portion
21 (21A to 21D) Male screw portion
22 (22A to 22D) Nut portion
30 (30A to 30D) Sensor unit
31 (31A to 31D) Sensor filter
32, 33 (32A to 32D, 33A to 33D) Pair of electrodes
34 (34A to 34D) Electrical heater
40 Control unit
41 Filter regeneration control unit
42 First PM amount estimating calculation unit
43 Second PM amount estimating calculation unit
44 Filter state determination unit

The invention claimed is:

1. An exhaust purification device comprising:
a filter provided in an exhaust system of an internal combustion engine and configured to collect particulate matter in exhaust gas;
a first sensor provided upstream of the filter in an exhaust direction of the exhaust gas and including: a first sensor filter having a plurality of first cells divided by porous partition walls and collecting the particulate matter in the exhaust gas to be introduced into the filter; and at least one pair of first electrodes arranged to face each other with the first cell interposed therebetween so as to form a capacitor;
a second sensor provided downstream of the filter in the exhaust direction of the exhaust gas and including: a second sensor filter having a plurality of second cells divided by porous partition walls and collecting the particulate matter in the exhaust gas discharged from the filter; and at least one pair of second electrodes arranged to face each other with the second cell interposed therebetween so as to form a capacitor; and
acquisition means for acquiring an efficiency of collecting the particulate matter in the filter, based on a first electrostatic capacitance between the at least one pair of first electrodes and a second electrostatic capacitance between the at least one pair of second electrodes,
wherein the acquisition means acquires the first electrostatic capacitance and the second electrostatic capacitance at predetermined periods, calculates a first electrostatic capacitance change rate from a plurality of first electrostatic capacitances including a latest first electrostatic capacitance, calculates a second electrostatic capacitance change rate from a plurality of second electrostatic capacitances including a latest second electrostatic capacitance, and acquires the efficiency of collecting the particulate matter in the filter based on the first electrostatic capacitance change rate and the second electrostatic capacitance change rate.

2. The exhaust purification device according to claim 1,
wherein the first sensor includes a first heater configured to generate heat by being energized and thus to combust and remove the particulate matter accumulated on the first sensor filter,
wherein the second sensor includes a second heater configured to generate heat by being energized and thus to combust and remove the particulate matter accumulated on the second sensor filter, and
wherein the exhaust purification device further comprises filter regeneration means for combusting and removing both the particulate matter accumulated on the first sensor filter and the particulate matter accumulated on the second sensor filter by energizing each of the first heater and the second heater in a case where a predetermined filter regeneration condition is satisfied.

3. The exhaust purification device according to claim 2,
wherein the first sensor filter is a first filter layer in which the plurality of first cells are arranged in parallel in one direction, and the second sensor filter is a second filter layer in which the plurality of second cells are arranged in parallel in one direction, and
wherein the at least one pair of first electrodes is at least one pair of first flat plate-shaped electrodes arranged to face each other with the first filter layer interposed therebetween, and the at least one pair of second electrodes is at least one pair of second flat plate-shaped electrodes arranged to face each other with the second filter layer interposed therebetween.

4. An exhaust purification device comprising:
a filter provided in an exhaust gas passage of an internal combustion engine and configured to collect particulate matter in exhaust gas;
a first sensor provided upstream of the filter in an exhaust direction of the exhaust gas and including: a first sensor filter having a plurality of first cells divided by porous partition walls and collecting the particulate matter in the exhaust gas to be introduced into the filter; and at least one pair of first electrodes arranged to face each other with the first cell interposed therebetween so as to form a capacitor;
a second sensor provided downstream of the filter in the exhaust direction of the exhaust gas and including: a second sensor filter having a plurality of second cells divided by porous partition walls and collecting the particulate matter in the exhaust gas discharged from the filter; and at least one pair of second electrodes arranged to face each other with the second cell interposed therebetween so as to form a capacitor; and
a control unit;
wherein the control unit is operated to execute:
an acquiring process of acquiring an efficiency of collecting the particulate matter in the filter, based on a first electrostatic capacitance between the at least one pair of first electrodes and a second electrostatic capacitance between the at least one pair of second electrodes,
wherein the acquiring process includes: acquiring the first electrostatic capacitance and the second electrostatic capacitance at predetermined periods, calculating a first electrostatic capacitance change rate from a plurality of first electrostatic capacitances including a latest first electrostatic capacitance, calculating a second electrostatic capacitance change rate from a plurality of second electrostatic capacitances including a latest second electrostatic capacitance, and acquiring the efficiency of collecting the particulate matter in the filter based on the first electrostatic capacitance change rate and the second electrostatic capacitance change rate.

5. The exhaust purification device according to claim 4,
wherein the first sensor includes a first heater configured to generate heat by being energized and thus to combust and remove the particulate matter accumulated on the first sensor filter, wherein the second sensor includes a second heater configured to generate heat by being energized and thus to combust and remove the particulate matter accumulated on the second sensor filter, and wherein the control unit is operated to further execute:

a regenerating process of regenerating the filter by combusting and removing both the particulate matter accumulated on the first sensor filter and the particulate matter accumulated on the second sensor filter by energizing each of the first heater and the second heater in a case where a predetermined filter regeneration condition is satisfied.

6. The exhaust purification device according to claim 5, wherein the first sensor filter is a first filter layer in which the plurality of first cells are arranged in parallel in one direction, and the second sensor filter is a second filter layer in which the plurality of second cells are arranged in parallel in one direction, and wherein the at least one pair of first electrodes is at least one pair of first flat plate-shaped electrodes arranged to face each other with the first filter layer interposed therebetween, and the at least one pair of second electrodes is at least one pair of second flat plate-shaped electrodes arranged to face each other with the second filter layer interposed therebetween.

\* \* \* \* \*